United States Patent [19]
Barrington

[11] Patent Number: 5,138,313
[45] Date of Patent: Aug. 11, 1992

[54] ELECTRICALLY INSULATIVE GAP SUB ASSEMBLY FOR TUBULAR GOODS

[75] Inventor: Burchus Q. Barrington, Duncan, Okla.

[73] Assignee: Halliburton Company, Duncan, Okla.

[21] Appl. No.: 614,763

[22] Filed: Nov. 15, 1990

[51] Int. Cl.$^5$ .............................................. G01V 1/00
[52] U.S. Cl. ....................................... 34/854.6; 175/40
[58] Field of Search .................. 340/854, 855, 861; 324/369, 356; 166/66; 175/50, 40

[56] References Cited

U.S. PATENT DOCUMENTS

| | | | |
|---|---|---|---|
| 2,354,887 | 8/1944 | Silverman et al. | 177/352 |
| 2,388,141 | 10/1945 | Harrington | 340/854 |
| 4,160,970 | 7/1979 | Nicolson | 340/18 LD |
| 4,348,672 | 9/1982 | Givler | 340/854 |
| 4,387,372 | 6/1983 | Smith et al. | 340/854 |
| 4,496,174 | 1/1985 | McDonald et al. | 285/53 |
| 4,684,946 | 8/1987 | Issenmann | 340/855 |
| 4,691,203 | 9/1987 | Rubin et al. | 340/856 |
| 5,030,877 | 7/1991 | Denk | 290/52 |

*Primary Examiner*—J. W. Eldred
*Attorney, Agent, or Firm*—James R. Duzan; Robert M. Hessin

[57] ABSTRACT

An electrically insulative gap sub for inclusion in a drill string that consists of upper and lower threaded joint members, an inner sleeve connected to extend axially from the upper joint member, an outer sleeve connected to the lower joint member and extending in concentric spacing over the inner sleeve, and a plurality of differently configured, annular blocks of insulative gap material serially arrayed and filling the void in between inner and outer sleeves. The gap material is a high performance molded resin capable of transmitting the requisite torque, tensile and compressive forces encountered along the drill string.

18 Claims, 2 Drawing Sheets

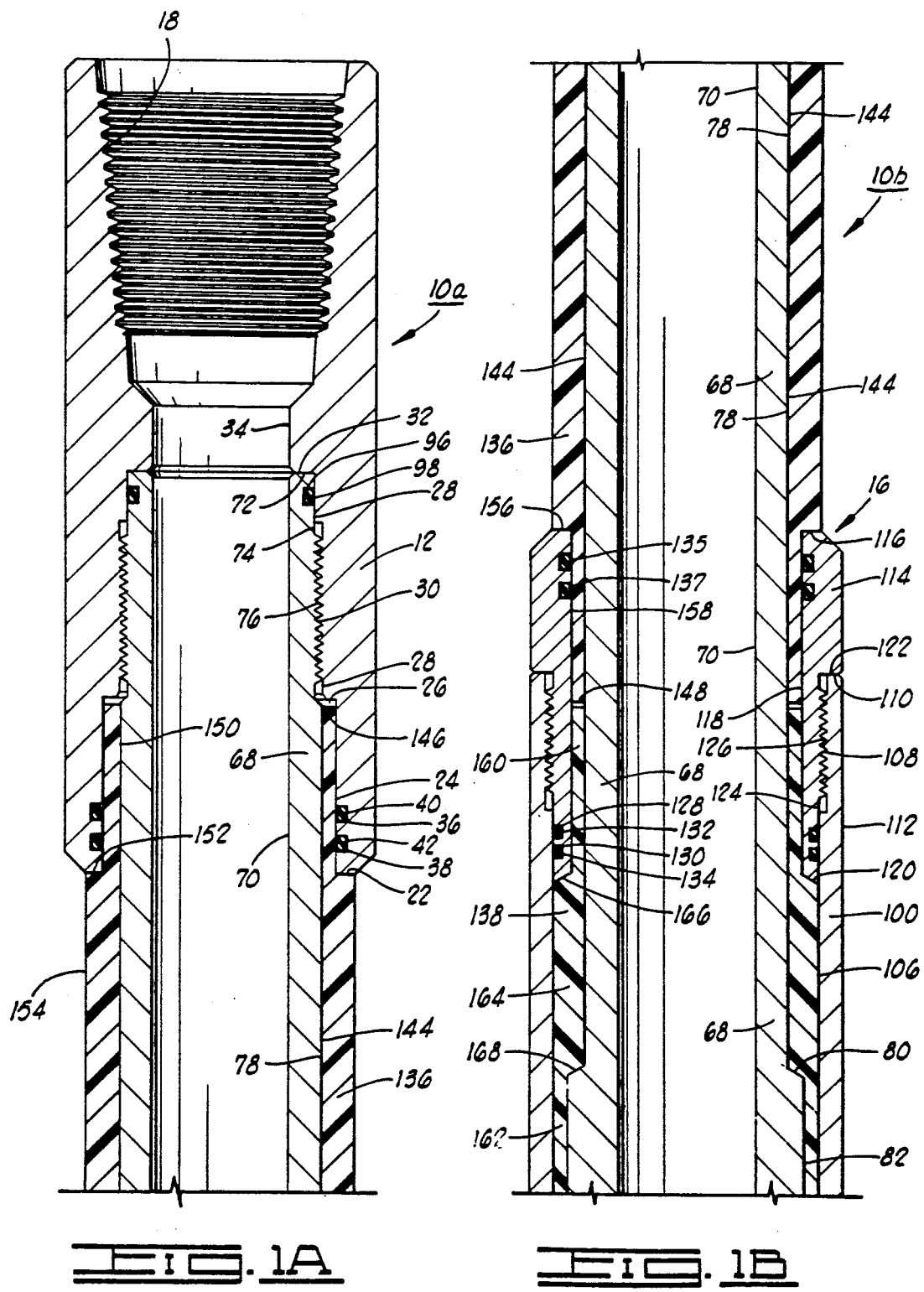

ELECTRICALLY INSULATIVE GAP SUB ASSEMBLY FOR TUBULAR GOODS

BACKGROUND OF THE INVENTION

1. Field of the Invention

The invention relates generally to a sub assembly for electrically insulating or isolating components of a drill string, i.e., tubing, drill pipe, drill collars and the like. More particularly, but not by way of limitation, it relates to an improved insulative sub assembly utilizing a high performance plastic in combination with steel connecting components to provide electrical insulation while maintaining drill string requirements as to torque, tensile and compressive forces through the sub assembly.

2. Description of the Prior Art

The prior art has included numerous methods and devices for causing a gap or insulation in components down along a drill string in order to develop electrical currents thereacross for transmission to the surface. Such transmission is utilized during MWD (measurement while drilling) data transmission uphole and it is used variously during logging operations for conveying different types of intelligence or modulation components to the surface for reception and processing. An early form of downhole insulation as taught by U.S. Pat. No. 2,354,887, a well signaling system, utilizes a coating of Bakelite insulation at a position downhole on a drill string whereupon, utilizing a pair of insulated electrodes, transmission energy sets up a radiating electric field that can be detected at the earth surface. A similar teaching is disclosed in U.S. Pat. No. 4,160,970 where the drill string itself is used to form an antenna as a counterpoise connection to the surrounding earth completes the sensing circuit for the receiver equipment.

U.S. Pat. No. 4,691,203 teaches a mode transducer that can be interconnected in the drill string. The mode transducer is formed from serial conductive sleeves separated by an insulating sleeve made of hard-anodized aluminum alloy. U.S. Pat. No. 4,348,672 teaches another form of drill collar gap sub that utilizes an insulative liner facing all joinder surfaces between successive pipe sections. This insulated gap sub consists of a first annular sub member that is threadedly received into a second annular sub member as connecting interfaces (including threads) are lined with an insulating dielectric material.

U.S. Pat. No. 4,387,372 utilizes an insulated point gap assembly for a toroidal coupled telemetry system. U.S. Pat. No. 4,496,174 discloses another form of drill collar gap sub wherein facing structure at joinder points of the drill string is insulated. Thus, an insulative material is applied on all threaded facings and annular washers coated with insulative material are used to further seal abutting interconnections between successive sub members. Finally, U.S. Pat. No. 4,684,946 teaches a drill collar having an insulating sheath around which is disposed a cylindrical metal sleeve for propagation of transmission energy. Sensor and transmitter equipment packages are contained in the drill collar interior and electrical connection via wire lead is made to the outer metal sleeve. In any of the various type gap subs which enable radio transmission it is essential to provide an insulation gap in the drill collar or such notwithstanding the severe environmental loading that will be encountered.

SUMMARY OF THE INVENTION

The present invention relates to an insulative gap sub for inclusion in a drill or tubing string to provide an insulative gap across which telemetering or like electrical signals may be developed for radiation to surface detecting equipment. The gap sub consists of an upper tubular member having securing threads for affixture into the drill pipe, drill collars or the like and extending an inner sleeve. A second component consists of the lower connector member which also extends an outer sleeve having an inside diameter greater than the outside diameter of the inner sleeve. An insert sleeve of high performance plastic resin formed in multiple pieces is then insertable between the inner sleeve and outer sleeve in interlocking fit to consolidate the substructure. A portion of the inner and outer sleeve and the insulative gap structure are of hexagonal construction in order to maintain torque integrity of the gap sub, and the longitudinal interlocking of the gap member as tortuously aligned relative to the inner sleeve and outer sleeve keeps tensile and compressive force integrity while maintaining the upper and lower connecting members totally electrically insulated from each other.

Therefore, it is an object of the present invention to provide a gap sub assembly to provide highly efficient coupling of telemetry signals for transmitting downhole oil well data to the surface.

It is also an object of the present invention to provide a gap sub assembly that utilizes composite insulation material that is assembled in plural parts that can be replaced separately as they are damaged or worn.

It is yet another object of the invention to provide a gap sub wherein the gap distance of the dielectric material can be easily controlled with adjustment of design parameters.

Finally, it is an object of the present invention to provide an electrically insulative gap sub that is rugged, simple of design and easy to manufacture and assemble.

Other objects and advantages of the invention will be evident from the following detailed description when read in conjunction with the accompanying drawings which illustrate the invention.

BRIEF DESCRIPTION OF THE DRAWINGS

FIG. 1A is a view in vertical section of the top portion of a gap sub constructed in accordance with the present invention;

FIG. 1B is a view in vertical section of a central portion of the gap sub assembly;

DETAILED DESCRIPTION OF THE INVENTION

Figures 1C, 2:
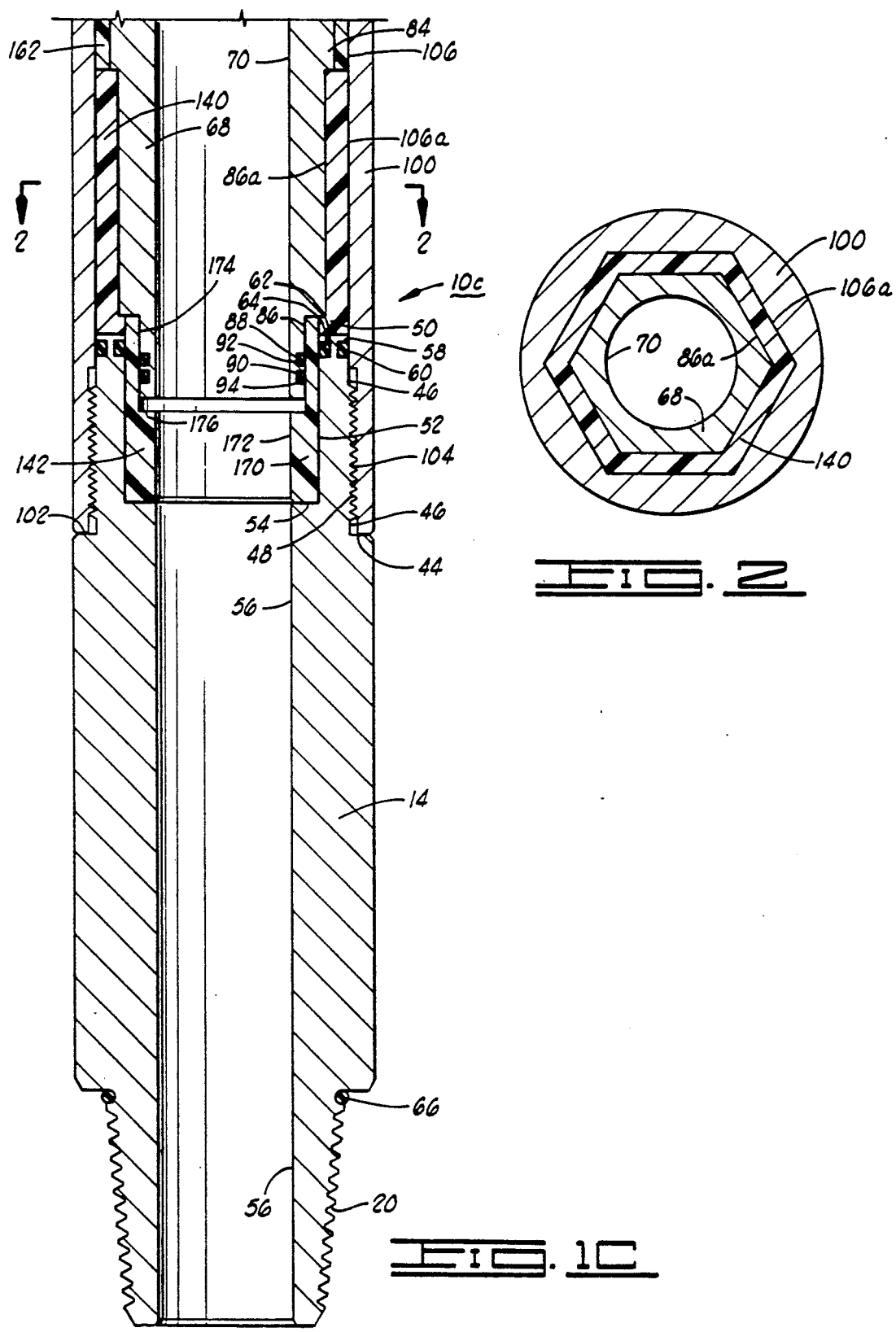
FIG. 1C is a view in vertical section of the bottom portion of the gap sub.
FIG. 2 is a cross-section taken along lines 2—2 of FIG. 1C.

Referring to FIGS. 1A, 1B and 1C, a sub assembly 10 consists of an upper box end joint member 12 and a lower pin end joint member 14 that sealingly support an electrically insulative gap assembly 16 therebetween. The joint members 12 and 14 are cylindrical configurations having axial pipe joinder female threads 18 and male threads 20, respectively. The box end/pin end thread arrangement may be a conventional type as used in drill pipe assembly, and it can also be used in tubing or drill collar strings.

The upper cylindrical joint member 12 is formed with an annular end wall 22 that leads into an axial counterbore 24 terminating in an internal annular shoulder 26. A more central bore 28 is then formed with threads 30 as bore 28 terminates in an annular shoulder 32 adjacent a central pipe bore 34. The counterbore 24 includes a pair of annular grooves 36 and 38 containing respective sealing O-rings 40 and 42.

Referring to FIG. 1C, the lower end joint member 14 is formed as a cylindrical body having a first annular shoulder 44 terminating in a cylindrical wall 46 having threads 48. The wall 46 terminates in an annular surface 50 adjoining an axial bore 52 terminating in a shoulder 54 around central bore 56. An annular groove 58 seating an O-ring 60 is formed around the upper portion of cylindrical wall 46, and an annular groove 62 is formed around the upper extremity of central bore 52 for seating of O-ring 64. The lower end of joint member 14 is formed with the male pipe joinder threads 20 about which is seated a sealing O-ring 66.

The upper end joint member 12 threadedly supports an inner sleeve 68 defining a central bore 70 down to its termination adjacent lower joint member 14 (see FIG. 1C). The upper en of inner sleeve 70 is formed with an annular end wall 72 extending into an outer cylindrical wall 74 having threads 76 for mating engagement with threads 30 of the joint member 12. Inner sleeve 70 then extends into an outer cylindrical wall 78 that extends throughout most of the insulative gap sub assembly 16 to formation of a canted annular shoulder 80 (FIG. 1B) and to a cylindrical surface 82 that terminates in a downwardly facing annular shoulder 84 (FIG. 1C) and, finally, to form a cylindrical wall 86a and 86. The portion 86a of the cylindrical wall 86, adjacent to and accommodating gap block 140, is an equi-lateral hexagon cross section, as will be further described below. The lower end of cylindrical wall 86 includes two annular grooves 88 and 90 wherein respective O-rings 92 and 94 are seated, and the top outer cylindrical wall 74 of inner sleeve 68 is sealed by annular groove 96 with O-ring 98.

The lower joint member 14 is connected to extend an outer sleeve 100 concentric with inner sleeve 68 and defining an insulative gap therebetween, as will be further described. Outer sleeve 100 has an annular end wall 102 and a threaded bore 104 for being received over threads 48 of cylindrical wall 46. Outer sleeve 100 then has an inner cylindrical wall 106 (with hexagonal portion 106a) that extends upward (FIG. 1B) to terminate in threaded bore 108 and annular end wall 110. Outer sleeve 100 has a cylindrical outer surface 112 that is continuous with the cylindrical outer surfaces of the respective upper and lower joint members 12 and 14.

A cap member 114 (FIG. 1B) is adapted for engagement within the outer sleeve 100. Thus, cap member 114 includes an upper annular surface 116 and an inner cylindrical wall 118 terminating in an outwardly canted, downward facing annular surface 120. The outer extremities of cap member 14 include a downwardly facing annular surface 122 forming into a cylindrical wall 124 having threads 126 with wall 124 terminating at the canted annular surface 120. Cylindrical wall 124 includes annular grooves 128 and 130 having respective 0-rings 132 and 134 seated therein. Groove/ring seals 135, 137 seal around the top of inner wall 118. The cap member 114 is engaged by threads 126/108 to function as part of the outer sleeve member as it is connected to outer sleeve 100.

The electrically insulative gap material retained between inner sleeve 68 and outer sleeve 100 is formed in four pieces An upper end gap block 136 (FIG. 1A) extends to about the mid point of FIG. 1B. A mid gap block 138 (bottom of FIG. 1B) functions primarily to resist tensile and compressive forces on the gap sub 10. A hexagonal gap block 140 (see FIG. 2) functions to resist torque forces along the gap sub 10. And, a lower end gap block 142 functions to fill out the internal sleeve space and maintain components in secure position. Noting FIG. 2, the internal wall formations adjacent the hexagonal gap block 140 are formed in hexagonal fitting relationship. Thus, the portion of internal wall 106a of outer sleeve 100 that is adjacent hexagonal block 140 is formed to fit. In like manner, the outer wall 86a of inner sleeve 68 is formed for the hexagonal fit within hexagonal gap block 140.

Referring to FIGS. 1A and 1B, the gap end block 136 is formed with a central bore 144 that is received closely over outer wall 78 of inner sleeve 68 while terminating in annular end walls 146 and 148. The outer extremities are defined by outer cylindrical wall 150 and annular shoulder 152 extending into outer cylindrical surface 154 extending down to downwardly facing annular shoulder 156 terminating in cylindrical wall 158. The gap distance or longitudinal distance between lower and upper metal connections that is separated by the dielectric material can be controlled by varying the lengths of gap end block 136 and the accommodating portion of inner sleeve 68 between end wall 22 of joint member 12 and end wall 156 of cap member 114.

The insulative gap block 138 (FIG. 1B) is an interlocking formation consisting of offset upper and lower sleeves 160 and 162 formed into a thicker central cylinder 164 and having opposed upper and lower canted shoulders 166 and 168.

Next in the succession is the hexagonal gap block 140 (FIG. 2) and, finally, the lower end gap block 142 which consists of an annular portion 170 having central bore 172 with counterbore 174 defining annular shoulder 176.

The actual gap material used to mold the assorted gap blocks 136, 138, 140 and 142 is a high performance plastic of which there are several to choose. A preferred type of gap material is a poly(amide-imide) material known commercially as TORLON ™ which is commercially available from Amoco Chemicals Corporation, Chicago, Ill. This particular molding resin has extremely good physical characteristics as regards the effects of water, chemical resistance, processing requirements, and torque, compression and tensile strength characteristics. Of course, in addition to the strength characteristics the resin material has a dielectric constant within the range desirable for insulative use in and around signal propagation equipment.

In assembly of the gap sub 10, one starts with the upper joint end 12 and inserts into bore 24 the first gap end piece 136. Next, the cap member 114 is inserted over outer wall 158 of gap end piece 136 and, thereafter, the tensile/compressive gap block 138 is slid end-wise into position within the wall 118 of cap member 114, and the inner sleeve 68 is slid end-wise through the assembly for engagement of threads 76 with threads 30 at upper joint member 12. In this position, the components are now captive as retained by the enlarged central cylinder 164 of gap block 138 as retained by canted annular shoulder 80 of inner sleeve 68. The hexagonal gap block 140 may then be positioned over inner sleeve 68 as outer sleeve 100 is then received over the entire assembly to threadedly engage outer sleeve threads 108 with the threads 126 of cap member 114. Finally, the lower end gap block 142 may be positioned to receive the lower end joint member 14 thereover and threaded engagement of joint member threads 48 with the lower bore threads 104 of outer sleeve 100 secures the entire sub tool in readiness for use.

In operation, the insulated sub 10 can be placed in a tubing string with selected telemetry or signal generation apparatus located therebelow. Signal transmission, a dual contact connection, can be effected with connection of one transmission output contact above the insulative gap and connection of the remaining transmission output contact to the metal structure below the insulative gap. Signals being transmitted will then radiate toroidally into the adjoining earth formation and the signals can then be detected at earth's surface and processed or displayed electronically for further evaluation.

Thus, in the case of a drill pipe string, the insulative sub 10 may be inserted in the drill string very near to the bottom and probably within the drill collar section with only instrument packaging and the drill head located proximately. This insulative gap sub is capable of supporting full required torque, compressive and tensile loading of the drill string while also providing the requisite insulation gap. More particularly, the tensile/compressive gap block 138 protects the drill string in the event of a failure due to tensile and/or compressive breakdown. Thus, if the gap material fails due to tensile or compressive force, that is the gap material disintegrates, then the drill string is protected from parting as the metal upset or canted shoulder 168 of inner sleeve 68 will catch the lesser diameter downwardly facing canted shoulder 120 of cap member 114. The drill string will thus remain suspended and in tact such that the equipment can be removed for repair of the gap sub 10.

Torquing protection is provided by the hexagonal gap block 140. If the gap block 140 should disintegrate due to excessive torque force, the points of inner sleeve 86a will interfere with the flat surfaces of hexagonal wall 106a of outer sleeve 100 to maintain torquing capability. In effect, the insulative sub 10 is a fail/safe section of drill string that is effective to provide insulation between selected upper and lower parts of the string. In addition, the insulation gap can be lengthened either by widening the gap between annular surface 22 of upper joint member 12 and annular surface 156 of cap member 114, or by extending the length of cylindrical section 170 of end gap block 142, bore 52 of lower joint member 14 being extended accordingly.

The foregoing discloses a novel form of insulative gap sub assembly for inclusion in the drill string to assure a break in conductivity. The composite, or dielectric material that insulates the connection between upper and lower pipe sections possesses good loading characteristics as to tensile, compression and torquing strength. The gap material also maintains stability and strength under adverse well conditions of temperature, pressure and presence of a number of different chemicals and corrosive well fluids. While the gap sub assembly renders the bottom of the drill pipe totally insulated from the remainder of the uphole pipe, the torque, tensile and compressive loading can remain compatible with drill pipe operation requirements so that the unit performs without limitation.

Changes may be made in combination and arrangement of elements as heretofore set forth in the specification and shown in the drawings; it being understood that changes may be made in the embodiments disclosed without departing from the spirit and scope of the invention as defined in the following claims.

What is claimed is:

1. An electrically insulative gap sub for inclusion in a string of tubular goods comprising:
    a first tubular member having threaded end connector and extending an axially aligned inner sleeve that defines the inside diameter of the tubular goods;
    a second tubular member having a threaded end connector and annular end wall and extending an axially aligned outer sleeve that defines an inside cylindrical wall that is concentric to and received over said inner sleeve of the first tubular member in spaced relationship; and
    an electrically insulative gap member consisting of at least one gap sleeve disposed in interlocking relationship between said inner sleeve and said outer sleeve thereby to electrically insulate between the first and second tubular members, said gap member consisting of at least one sleeve having the first end retained on the inner sleeve of the first tubular member, the second end disposed between said inner sleeve and the outer sleeve of the second tubular member, and having a mid-portion of increased diametric thickness interlocked in abutment between the threaded connector of the first tubular member and the outer sleeve of the second tubular member.

2. An insulative gap sub as set forth in claim 1 wherein said first tubular member comprises:
    a connector head having axially aligned first and second internal threads; and
    an elongated sleeve having first and second ends and having threads on the first end for mating engagement with said second internal threads, and having a downward facing annular shoulder proximate the second end for interlocked engagement with said gap member.

3. An insulative gap sub as set forth in claim 1 wherein said second tubular member comprises:
    a cylindrical connector having axially aligned first and second external threads with an axial flow way defined by the inside diameter, the first threads being formed about the cylindrical wall adjacent an external annular shoulder and the second threads being said threaded connector;
    an elongated second sleeve having first and second ends with the second end threadedly received over said first external threads, said second sleeve second end having internal threads; and
    a cap member having first and second ends with the first end formed for interlocking abutment within said gap member and the second end having an end wall and being formed with external threads for reception within the second sleeve internal threads.

4. An insulative gap sub as set forth in claim 2 wherein said second tubular member comprises:
    a cylindrical connector having axially aligned first and second external threads with an axial flow way defined by the inside diameter, the first threads being formed about the cylindrical wall adjacent an external annular shoulder and the second threads being said threaded connector;

an elongated second sleeve having first and second ends with the second end threadedly received over said first external threads, said second sleeve second end having internal threads; and a cap member having first and second ends with the first end formed for interlocking abutment within said gap member and the second end formed with external threads for reception within the second sleeve internal threads.

5. An insulative gap sub as set forth in claim 1 which is further characterized to include:

an upset annular shoulder formed on said inner sleeve; and at least one sleeve of said gap member disposed between said inner sleeve and said outer sleeve is disposed in longitudinal abutment between said upset annular shoulder and said second tubular member annular end wall.

6. An insulative gap sub as set forth in claim 3 which is further characterized to include:

a second upset annular shoulder formed on said inner tubular portion; and at least one sleeve of said gap member having a generally central portion disposed between said inner and outer sleeves and being interlocked longitudinally between said second upset annular shoulder and said cap member end wall.

7. An insulative gap sub as set forth in claim 1 wherein:

said gap member is formed from a molded polyamide-imide resin.

8. An insulative gap sub as set forth in claim 5 wherein:

said at least one sleeve of said gap member is formed as a equi-lateral hexagonal tube.

9. An electrically insulative gap sub for inclusion in a string of tubular goods, comprising:

a first tubular member having first and second ends with internal threads formed at respective ends;

an inner sleeve having first end external threads for reception in the second internal threads of the first tubular member and extending a second end in axial alignment from said first tubular member;

a second tubular member having first and second ends with external threads formed on the respective first and second ends;

an outer sleeve having second end internal threads for reception on the first end external threads of said second tubular member, said outer sleeve extending concentrically over a portion of the inner sleeve to terminate in a first end having internal threads;

a cap member threadedly received into the outer sleeve first end and having a central bore extending in concentric spacing over a portion of said inner sleeve; and a sleeve of electrically insulative gap material extending from said first tubular member to the second tubular member and interlocked in close reception between said inner sleeve and outer sleeve;

whereby there exists an electrically insulative gap between said first and second tubular members.

10. An insulative gap sub as set forth in claim 9 wherein said sleeve of electrically insulative gap material comprises:

a plurality of serially arrayed gap blocks.

11. An insulative gap sub as set forth in claim 10 which is further characterized in that:

at least one of said gap blocks is interlocked in position between said inner and outer sleeves to convey tensile and compressive forces through said gap sub.

12. An insulative gap sub as set forth in claim 10 which is further characterized in that:

at least one of said gap blocks is interlocked in position between said inner and outer sleeves to convey torque force through said gap sub.

13. An insulating gap sub as set forth in claim 12 wherein:

said at least one gap block is a tubular formation having hexagonal cross-section; and said inner sleeve outer wall and outer sleeve inner wall adjacent the gap block are each formed with accommodating hexagonal shape to receive the gap block in close surround.

14. An insulative gap sub as set forth in claim 9 wherein:

said insulative gap material is a molded polyamide-imide resin.

15. An insulative gap sub as set forth in claim 9 which is further characterized to include:

sealing means maintaining the gap sub interior free from any well fluids.

16. An insulative gap sub as set forth in claim 15 which includes:

first sealing rings sealing joinder of the first tubular member to the sleeve of insulative gap material;

second sealing rings sealing joinder of the sleeve of insulative gap material to the cap member;

third sealing rings sealing joinder of the cap member to the outer sleeve; and fourth sealing ring means sealing joinder of the outer sleeve to the second tubular member.

17. An insulative gap sub as set forth in claim 11 which includes:

first sealing rings sealing joinder of the first tubular member to the sleeve of insulative gap material;

second sealing rings sealing joinder of the sleeve of insulative gap material to the cap member;

third sealing rings sealing joinder of the cap member to the outer sleeve; and fourth sealing ring means sealing joinder of the outer sleeve to the second tubular member.

18. An insulative gap sub as set forth in claim 11 which is further characterized to include:

the cap member of the outer sleeve has a downward facing, canted annular surface at the terminus of said central bore which is secured in contact with an upward facing, canted annular shoulder on said at least one gap block sleeve; and the inner sleeve has an upwardly facing, canted annular shoulder which is in contact with a downwardly facing, canted internal surface on said at least one gap block sleeve;

whereby upon failure of the gap block, the annular surface of the cap member will hang on the annular shoulder of the inner sleeve thereby to avoid parting of the gap sub.

* * * * *